US005348336A

United States Patent [19]

Fernie et al.

[11] Patent Number: 5,348,336

[45] Date of Patent: Sep. 20, 1994

[54] WALKING AID

[76] Inventors: Geoffrey R. Fernie, 29 Blaketon Road, Etobicoke, Ontario, Canada, M9B 4W4; Brian P. Doyle, 36 High Park Avenue, Toronto, Ontario, Canada, M6P 2R9; Gerald T. Griggs, 77 Shrewbury Square, Scarborough, Ontario, Canada, M1T 1L4

[21] Appl. No.: 15,443

[22] Filed: Feb. 9, 1993

[51] Int. Cl.[5] .......... B62B 3/02

[52] U.S. Cl. .......... 280/641; 280/42; 280/651; 280/47.371

[58] Field of Search .......... 280/641, 642, 42, 647, 280/651, 657, 87.041, 47.371, 47.34; 128/25 R

[56] References Cited

U.S. PATENT DOCUMENTS

| | | | |
|---|---|---|---|
| 3,637,232 | 1/1972 | Bourgraf et al. | 280/641 |
| 3,872,945 | 3/1975 | Hickman et al. | 280/87.041 |
| 4,211,309 | 7/1980 | Ruggiero | 280/87.041 |
| 4,813,701 | 3/1989 | Ballard | 280/841 |
| 4,867,438 | 9/1989 | Steckert et al. | 280/87.051 |
| 5,020,560 | 6/1991 | Turbeville | 280/42 |

*Primary Examiner*—Richard M. Camby

[57] ABSTRACT

A walking aid for a handicapped person having a frame with wheels and brakes, handles attached to the frame at a suitable height for a person, who is enabled to push the walking aid along a walking surface, at least one brake operating assembly including a fixed handbar portion fixed as a handgrip extension of the handles, and a moveable member movably secured to the fixed handbar portion in coaxial relation so that the moveable member may be swung relative to the axis of the fixed portion, the moveable member being normally aligned with and substantially coaxial with the fixed portion, movement of said moveable member moving it out of coaxial alignment, and the brake cable being attached between the fixed portion and the moveable member so that movement of the moveable member will cause extension of the brake cable thus retarding the walking aid. Also disclosed is a folding mechanism for a walking aid, having swing arms linked together for swinging between extended and folded positions, and a lock for securing the arms in a semi-folded position and having a seat with height adjustments supported by the swing arms.

15 Claims, 5 Drawing Sheets

WALKING AID

FIELD OF THE INVENTION

The invention relates to walking aids for physically handicapped persons, and in particular, to the provision of such a walking aid with wheels, and brake means for braking or retarding the movement of the wheels, and collapsible means for folding and opening the walking aid.

BACKGROUND OF THE INVENTION

Walking aids for physically handicapped persons may vary from a simple walking stick, to a crutch, and eventually to a wheeled device with handlebars. In this case, the person grasps the two handlebars and pushes the device in front of him or her, and walks behind it. This type of device is usually used where the degree of handicap is too great to permit walking, for example, with a simple walking stick.

Some of these mobile walking aids, are provided with some form of carrier for goods to be carried, and indeed, persons may be able to carry a substantial quantity of goods, such as groceries, in such a walking aid. Thus they are rendered less dependent on assistance from others, and it gives them a greater sense of self-sufficiency.

However, one of the problems with mobile or wheeled walking aids is that on a downgrade they may tend to, as it were, run away from the person. If a person leans heavily on the handlebars, they may in fact, push the device too far ahead of them and will thus loose the support required. Similarly, if a quantity of goods or groceries is being carried on the device, the effect may be even more severe.

It is accordingly desirable to provide such a mobile wheeled walking device with some form of braking means. In the part, this has in fact between provided, simply by attaching typical bicycle-type braking handle levers underneath the handlebars. The braking levers could be connected by typical flexible cables to any suitable form of brakes. However, many of such physically handicapped people may also suffer from some degree of handicap of the hands. They may suffer, for example, from arthritis or some other complaint which makes the hand grip weak or else extremely painful. Consequently, it is desirable to provide a solution to this problem which will enable a person with somewhat handicapped hand function to be able to apply the brakes without having to extend the fingers and grasp a braking lever.

In the use of such walking aids, it is also desirable that the walking aid shall be collapsible so that it maybe folded up, to bring it indoors, or to carry it in an automobile, bus or other form of transportation. Various forms of collapsible mechanisms have been used in the past. In the majority of cases however, they were relatively limited in application, and could either be used fully opened up, or alternatively the walking aid could simply be folded shut for transportation or storage.

It is however, desirable that the walking aid shall also be capable of being used in a number of other situations. For example, it may be desirable for the walking aid to provide a seat for the person, so that from time to time they may rest. It is also desirable that the walking aid shall be capable of being used indoors in a dwelling. The typical walking aid is relatively wide, so as to provide good stability, and also to permit the person to step between the two rear wheels of the walking aid. In practice, these requirements means that the walking aid is usually of little use indoors in a conventional dwelling. In the majority of cases, the typical walking aid when used opened up, is not capable of passing through a doorway in a dwelling. It is, therefore, considered desirable that the folding or collapsing mechanism in the walking aid shall be capable of being set to as it were a "semi-closed" position, in which it provides a sufficient degree of support for walking about a dwelling, but in which its width is considerably less than when fully opened up. This will greatly increase the usefulness and adaptability of the walking aid, and also render the person more mobile and self-sufficient within their own dwelling.

In addition to all these features, it is also desirable that some form of adjustment shall be provided in the walking aid so as to adjust the height of the seating portion of the walking aid, to suit the build and size of the person using it.

BRIEF SUMMARY OF THE INVENTION

With a view to overcoming the foregoing problems, the invention comprises, a walking aid for a handicapped person and which comprises, a frame, wheels on said frame for engaging a walking surface, brake means for engaging at least one of said wheels, handle means attached to said frame, and being oriented at a suitable height for a person, who is thereby enabled to push the walking aid along the walking surface, two fixed handbar portions fixed to said handle means oriented for gripping by respective hands of the person, at least one brake operating moveable member movably secured to a said fixed handbar portion in alignment therewith whereby said moveable member may be swung relative to said one fixed handbar portion, said moveable member being normally aligned with and substantially coaxial with said fixed handbar portion, movement of said moveable member moving the same out of such alignment, and, brake cable means attached means extending between said fixed portion and said moveable member, whereby movement of said moveable member out of alignment with said fixed handbar portion will cause extension of said brake cable means thereby applying said brake means, and retarding said walking aid.

The invention further comprises such a walking aid and wherein said fixed handbar portions are attached to said handle means of said frame of said walking aid at spaced apart locations, and opening means in at least one said fixed handbar portion for receiving said brake cable therethrough, whereby said fixed handbar portion may be used as a handgrip by a person for hand gripping and pushing said walking aid, with said brake cable passing within a said hand gripping said fixed handbar portion.

The invention further comprises such a walking aid and wherein said moveable member comprises an endwise-axial extension of said fixed handbar portion, coaxial with the central axis thereof, and a pivot axis defined between said fixed portion and said moveable member, offset to one side of said central axis thereof, whereby movement of said moveable member relative to said fixed portion will cause extension of said brake cable as aforesaid.

The invention further comprises such a walking aid and wherein said moveable member incorporates recess means for securing an end of a flexible brake cable.

The invention further comprises such a walking aid and wherein said brake cable comprises a cable sleeve and an inner moveable cable portion, and wherein said fixed handbar portion incorporates abutment means for engaging said cable sleeve, while permitting said cable portion to move therethrough.

The invention further comprises such a walking aid and wherein said fixed handbar portion incorporates adjustment means for adjusting the position of said abutment means and said cable sleeve relative to said fixed handbar portion.

The invention further comprises such a walking aid and including an outer continuous flexible cover member, adapted to enclose and cover both said fixed handbar portion and said moveable member, whereby hinging of said moveable member relative to said fixed handbar portion takes place within said outer cover member.

The invention further comprises such a walking aid wherein said fixed handbar portion defines an elongated recess, and including a moveable block member located within said recess, and adjustable means engaging said moveable block member for moving the same within said recess axially relative to said fixed handbar portion, said abutment means being located in said moveable block portion.

The invention further comprises such a walking aid and including an adjustment screw member extending through said fixed handbar portion, and being received in a threaded opening in said moveable block portion, for adjusting the position of the same relative to said fixed handbar portion.

The invention further comprises such a walking aid and wherein said moveable block portion defines a cable opening therethrough, for receiving said brake cable therethrough, and an enlarged counter bore registering with said cable opening, for receiving said brake sleeve therein, and defining said abutment means.

In the further embodiment the invention further comprises such a walking aid for a handicapped person and which comprises, first and second side frames, wheels carried on respective side frames for engaging a walking surface, handle means attached to said side frames and oriented at a suitable height for a handicapped person, first and second transverse arm members secured to respective first and second side frames, and extending transversely in registration with one another between said first and second side frames, and, interlocking rotational means connecting between said first and second arms, whereby said first and second arms are caused to swing in unison with one another, thereby permitting said side frames to be moved between folded, and extended positions.

The invention further comprises such a walking aid and including adjustable locking means for locking said transverse arms in intermediate semi-extended position.

The invention further comprises such a walking aid and including a central post member located intermediate said side frames, and pivot means connecting said first and second transverse arms to said central post member.

The invention further comprises such a walking aid and wherein said first and second transverse arm members comprise first and second lower arm members and first and second upper arm members, and including moveable mounting means mounting said first and second upper arm members to respective said first and second side frames, and moveable mounting means mounting said first and second transverse arm members to said central post member, whereby said first and second upper arm members may be raised and lowered relative to said first and second lower arm members.

The invention further comprises such a walking aid and including seating portions swingably connected to respective said first and second upper arm members, and moveable in unison therewith.

The invention further comprises such a walking aid and wherein said first and second side frames include respectively front and rear side frame portions, pivot means connecting said first and second side frame portions together for swinging together and apart from one another, and strut members extending between said front and rear frame portions, for holding the same in their swung apart position.

The various features of novelty which characterize the invention are pointed out with more particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

IN THE DRAWINGS

DESCRIPTION OF A SPECIFIC EMBODIMENT

Figure 1:
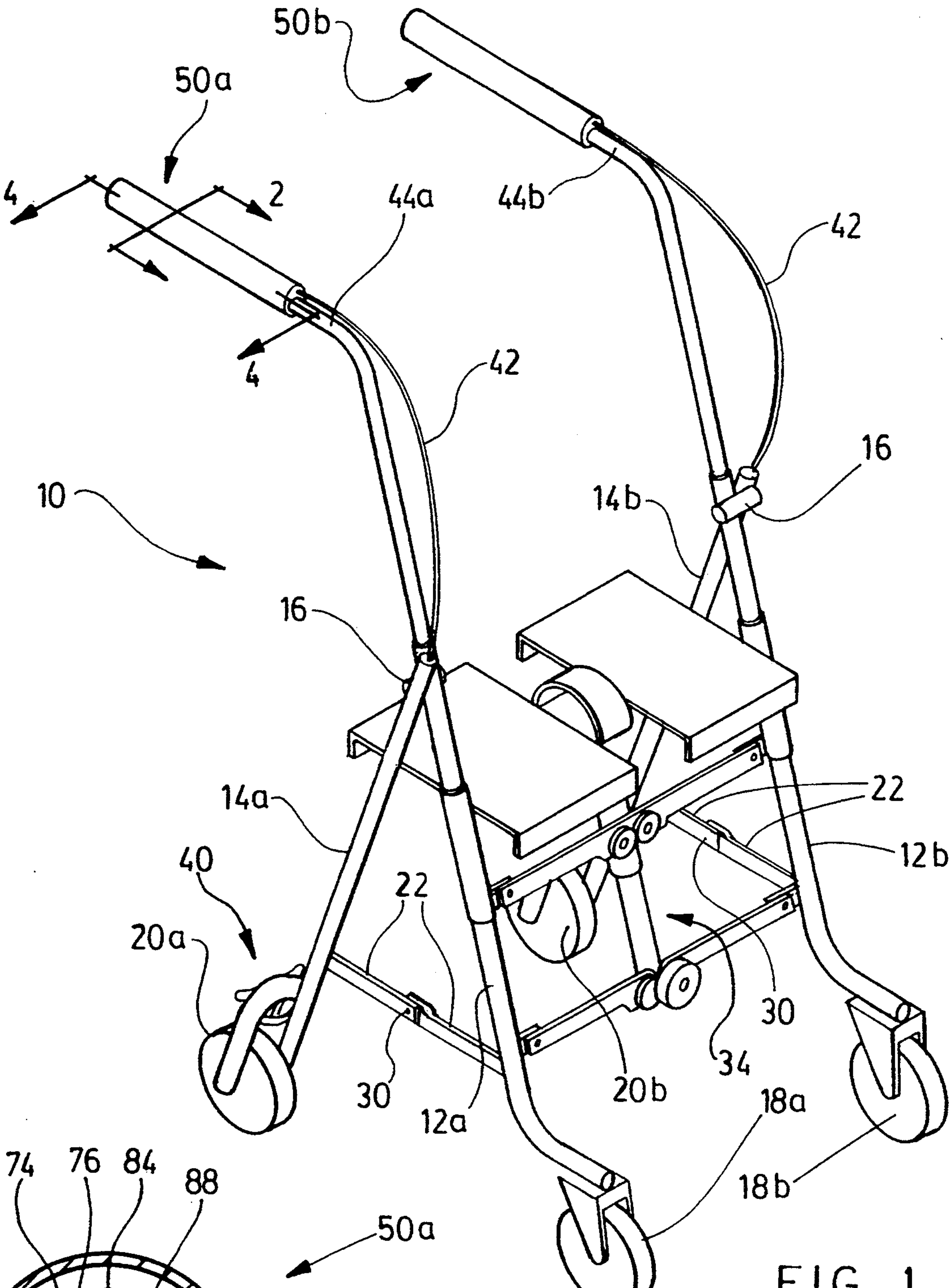
FIG. 1 is a general perspective illustration of a typical walking aid showing the braking means in accordance with the invention.
Figure 2:
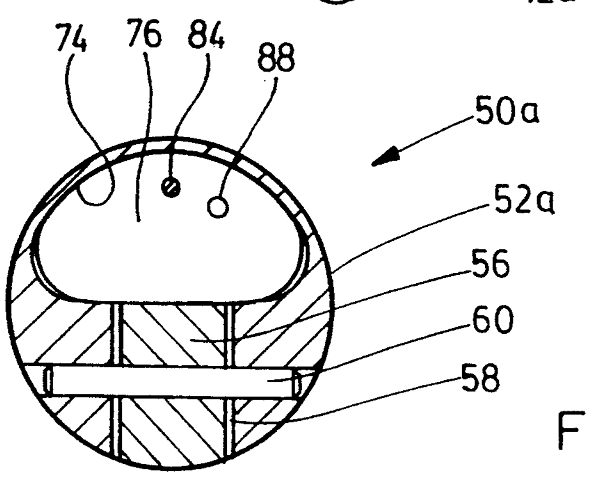
FIG. 2 is a section of the brake operating assembly, shown along line 2—2 of FIG. 1.
Figure 3:
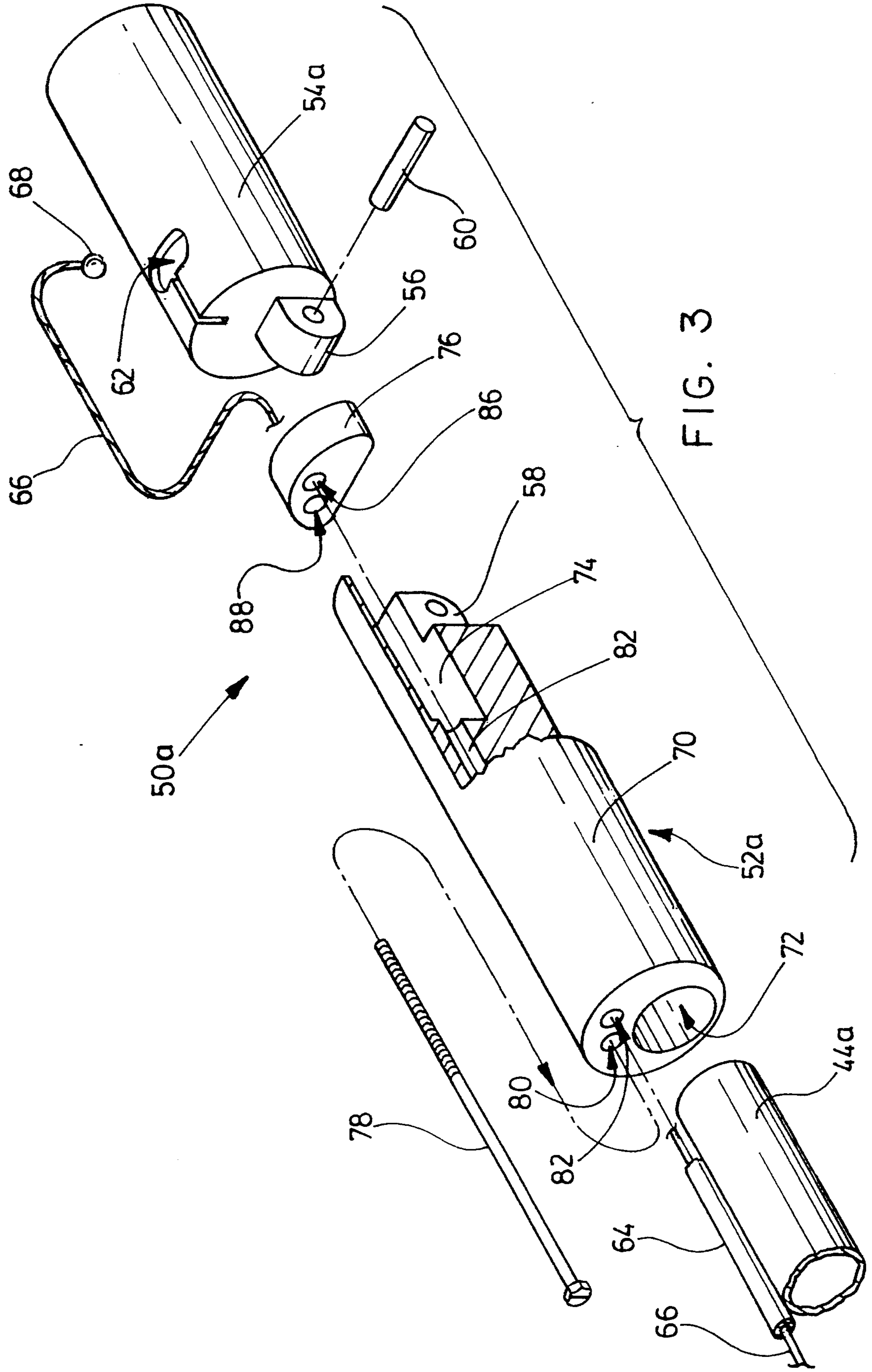
FIG. 3 is an exploded perspective view of one of the braking operating assemblies of FIG. 1.

Referring first of all to FIG. 1, it will be seen that this illustrates a walking aid 10 for handicapped persons embodying the invention. It is designed to simply be grasped with the hands and pushed in front of the person as a person walks along.

For this purpose, the walking aid 10 will typically comprise, in the case of a collapsible walking aid, two side frames **12*a*–14*a* and 12*b*–14*b*, which are respectively pivoted together as at 16*a*–16*b***, so that they may be swung closed and opened in the manner of a pair of scissors.

At the bottom ends of each of the side frames 12 and 14 there are located wheels, **18*a*–20*a*, 18*b*–20*b***.

Pairs of struts 22, 22, are typically pivoted as at 30, and are also pivoted by suitable pivots to the side frames themselves. In this way, the struts may simply be folded upwardly thereby swinging the two pairs of side frames together in a scissors fashion.

For use, as a walking aid, the struts Will of course, be extended, and a typical over-centre locking device (not shown), will hold them extended.

The respective side frames **12*a*–12*b*, are connected transversely together by a foldable mechanism indicated generally as 34**, the details of which will be described below, the function of which is either to hold the side frames apart, or to permit them to be closed together for storage transportation or the like, and which also, in the manner to be described below, permits them to be extended apart in a semi-closed, or partially opened position, and which also provides seating, all of which is described below.

The two rear wheels 20a–20b are equipped with typical braking mechanisms indicated generally as 40, incorporating the usual spring mechanism (not shown) to hold them open, and operated by brake cables 42. The upper ends of the side frames 12a–12b are extended more or less horizontally rearwardly, and provide handles 44a–44b by means of which a person may grasp the walking aid and push it along, and support themselves.

As mentioned above, in the past, brake cables of this type have typically been operated by separate braking levers essentially similar in all material respects to braking levers used on bicycles. These braking levers required the person to extend their fingers from the handbars, downwardly, to grasp the braking levers (not shown) so as to apply the brakes. As mentioned above, this operation requires a certain amount of manual dexterity and strength, which may not be present in a typical person using such a walking aid.

In accordance with the invention, a brake operating mechanism 50a–50b is secured to respective handles 44a–44b. The brake operating mechanisms consists of a fixed handbar portions 52a–52b and moveable operating members 54a–54b.

The fixed handbar portions and the moveable operating members in this embodiment are each formed of generally cylindrical material, having a common diameter and profile, and defining a common central axis, so that the operating members are aligned with respective handbar portion, in the normal, or "out of use" position, to be described below.

Each moveable member defines a pivot arm 58, each handbar portion defines a slot 56, and the pivot arm 58 fits within its respective slot. The pivot arms and respective slots are swingably connected to one another by means of respective hinge pins 60.

In well known manner, the other end of the sleeve 64 and wire cable 66 are connected to respective braking mechanisms 40, in a manner essentially similar to that well known in the bicycle art for example, although various different forms of connection may be used, such as are well known, without departing from the scope of the invention.

It will be noted that the hinge pin 60 is offset downwardly from the central axis of the fixed handbar portion 52 and the moveable member 54.

The moveable members 54 define a brake cable recesses of generally keyhole-shape in plan indicated as 62, on the upper sides thereof opposite to hinge pins 60.

The brake cable 42 is of the typical flexible cable design. It is an outer sleeve 64 and within the outer sleeve 64 moveable flexible wire cable 66 is provided, terminating in a generally enlarged head 68, which is adapted to be received in the recess 62 in the member 54.)

The fixed handbar portion 52 of each operating assembly 50a–50b comprises a generally cylindrical body 70, which is oversized relative to the handle 44 of the walker. The front end of the body 70 defines an offset handle opening 72, to receive the handle 44 of the walker. The opening 72 extends into the body 70,a sufficient distance to hold the end of the handle 44 securely.

At the other, or rearward end of the body 70 a generally semi-circular recess 74 is defined, within the body 70, which extends axially along the body 70 towards the forward opening 72, but terminates short of such opening. Recess 74 as stated is of generally semi-circular shape in section, and contains a moveable brake cable retention block 76 of generally semi-cylindrical shape. Block 76 is adjustably moveable within the recess 74 by means of the adjustment screw 78. Adjustment screw 78 is located in an axial bore 80, extending parallel to and to one side of opening 74. Bore 80 opens out at the front end of the body 70 and communicating with semi-circular recess 74. Screw 78 extends outwardly from the front of the body 70, so as to permit manual adjustment of block 76 by rotation of screw 78 one way or the other.

A brake sleeve bore 82 is formed in body 70 of sufficient size to receive the brake cable sleeve 64.

Figure 4:
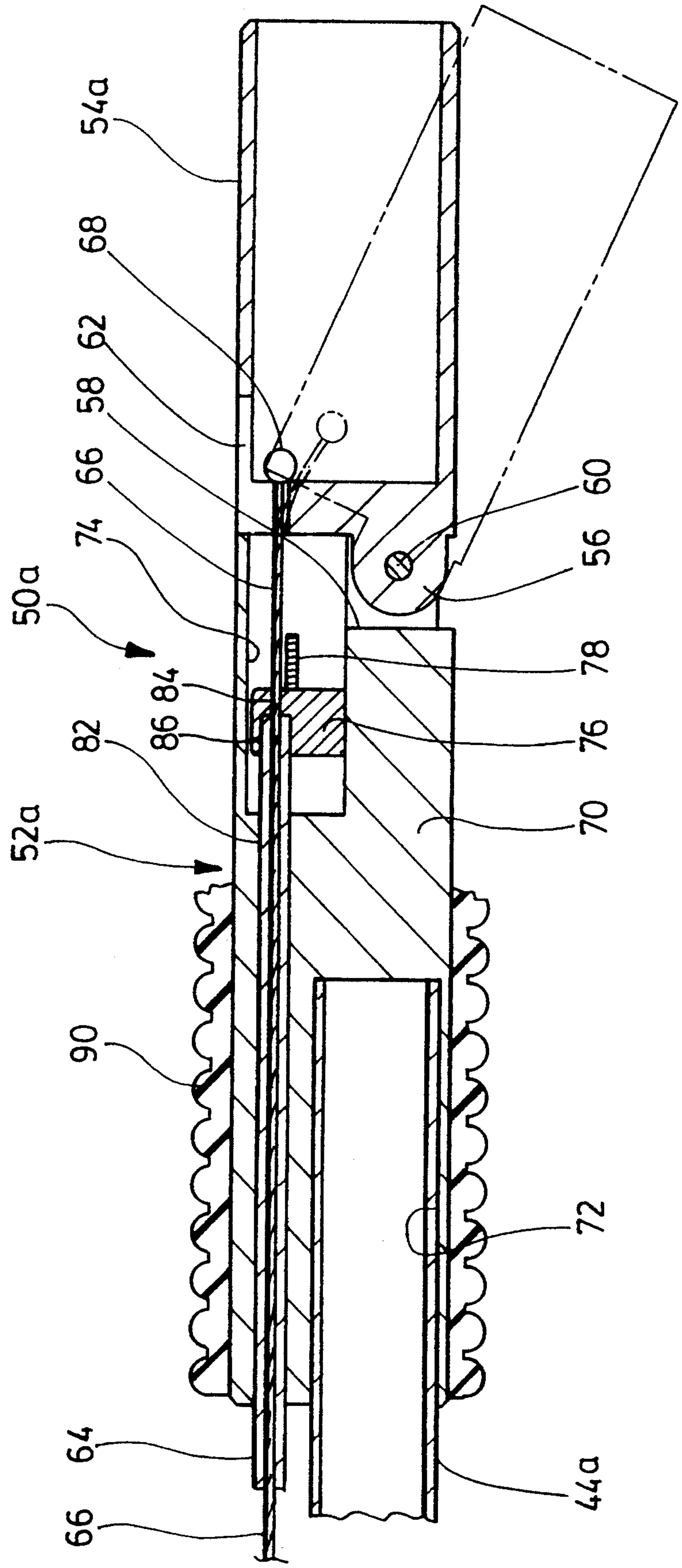
FIG. 4 is a sectional side elevation along line 4—4 of FIG. 1 of one of the brake operating assemblies of the walking aid of FIG. 1, showing parts thereof in phantom shown.

The block 76 is formed with a bore 84, to receive the interior wire cable 66 of the brake cable. At the forward (right hand end in FIG. 4) end of the bore 84, an enlarged recess 86 is formed to receive and hold the end of the brake cable sleeve 64.

A threaded bore 88 is formed in block 76 to receive adjustment screw 78.

The entire brake operating mechanism 50 on each handle is preferably enclosed with a cushioned relatively thick rubber or synthetic foam material cover 90.

In operation, a person using the walker will hold the fixed portions 52a–52b connected to the respective handles 4a–44b, in normal mode. While pushing along level ground, the person will simply push the walker in front.

In the event of encountering a downgrade, all that the person has to do is to slide their hands rearwardly by a matter of two inches or so, so as to partially grasp the moveable members 54a–54b. By simply downward pressure of the palms of the hands on the two moveable members, the brake cables 66 will be extended from their respective brake cable sleeves 64, thereby applying the brakes to the wheels.

There is little change in the grip of the hands or of the fingers, and the brake operating mechanism can even be used by persons with handicapped hands, such as sufferers from arthritis, without inconvenience.

When braking is no longer required, the hands are simply slid forward on to the fixed portions 52a–52b and the moveable portions 54a–54b will then simply swing upwardly, under the influence of the spring operated braking mechanisms 40, so that they are once again coaxial and aligned with the fixed portions 52a–52b.

In the event of a change in the setting of the cables being required, then a person can operate the set screw 78 by means of a screwdriver or the like, so as to draw the block 76 along the recess 76. This will then cause the wire cable 66 to be shortened, thereby tightening up the brakes.

It will also be apparent that by using the invention, existing walking aids can be retrofitted with the braking mechanism according to the invention, so that the braking mechanism is suitable both for existing walkers of many different designs, as well as for installation on OEM walkers.

All that is required to adapt the braking mechanism of the invention to various types of walkers, is to supply bodies 70 with openings 72 appropriate to the diameters or shapes of the tubes of which the walker arms are made.

As described above, the invention also provides a walker or walking aid which is collapsible or foldable transversely and which is also collapsible or foldable longitudinally, and which is also adjustable for persons of different height.

Figure 5:
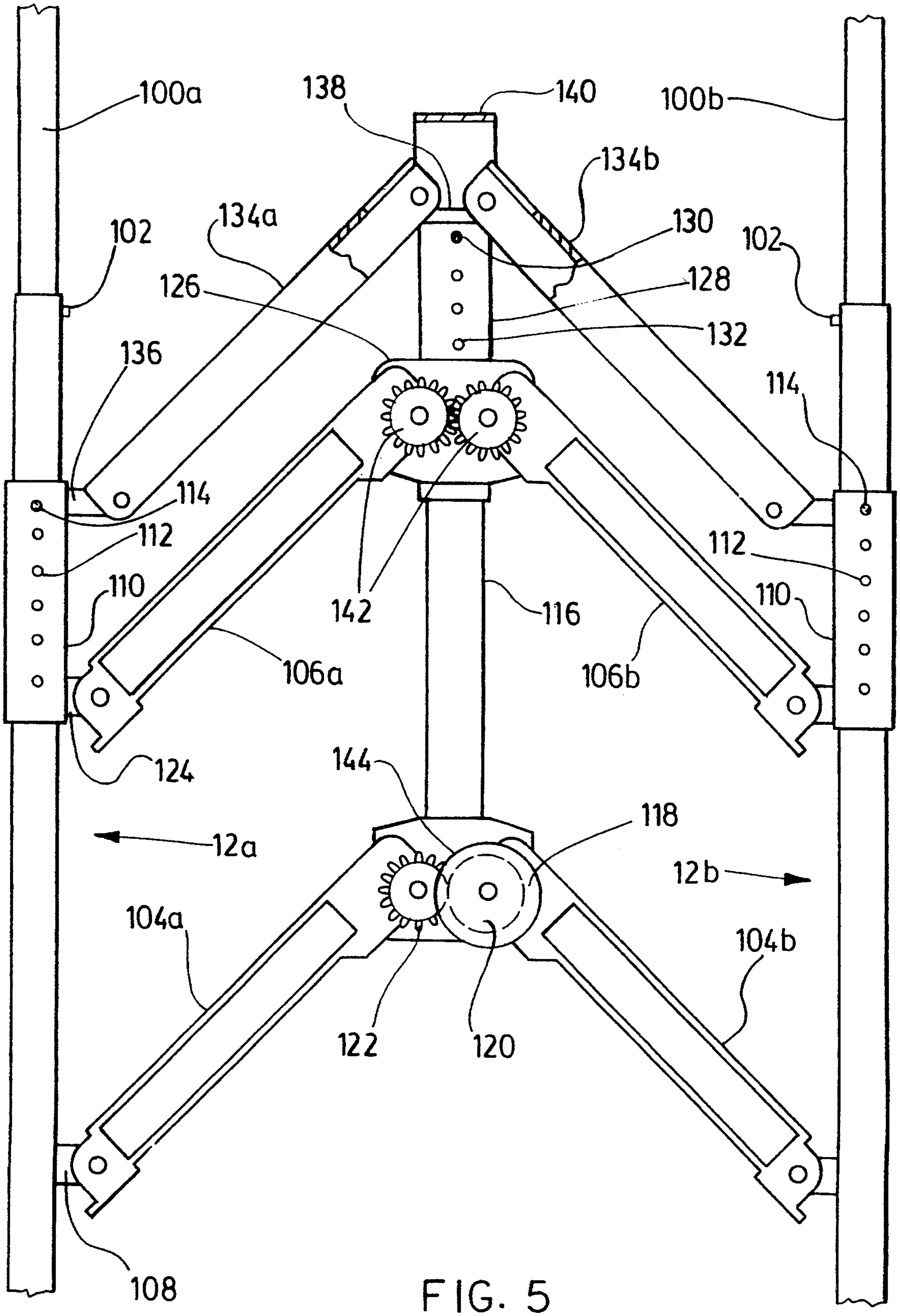
FIG. 5 is a front elevational view of the folding mechanism of the walking aid of FIG. 1, shown partially extended, and, FIG. 6 is a front elevational view of the folding mechanism shown folded shut.

In order to provide a height adjustment, as illustrated in more detail in FIG. 5, it will be seen that the side members 12a-2b may be of telescopic construction, and include upper side portions 100a-100b which are of reduced cross-section in relation to the side members 12a-12b and may be telescoped in and out. The telescoped position may be set by means of a typical spring-loaded detent 102, in the telescopic portions 100a-100b and extending through suitable holes in the upper ends of member 12a-12b.

In this way the height of the handles 44a may be raised or lowered to suit the body of the user.

The means whereby the side frames 12 and 14 may be folded together longitudinally has already been described above.

Figure 6:
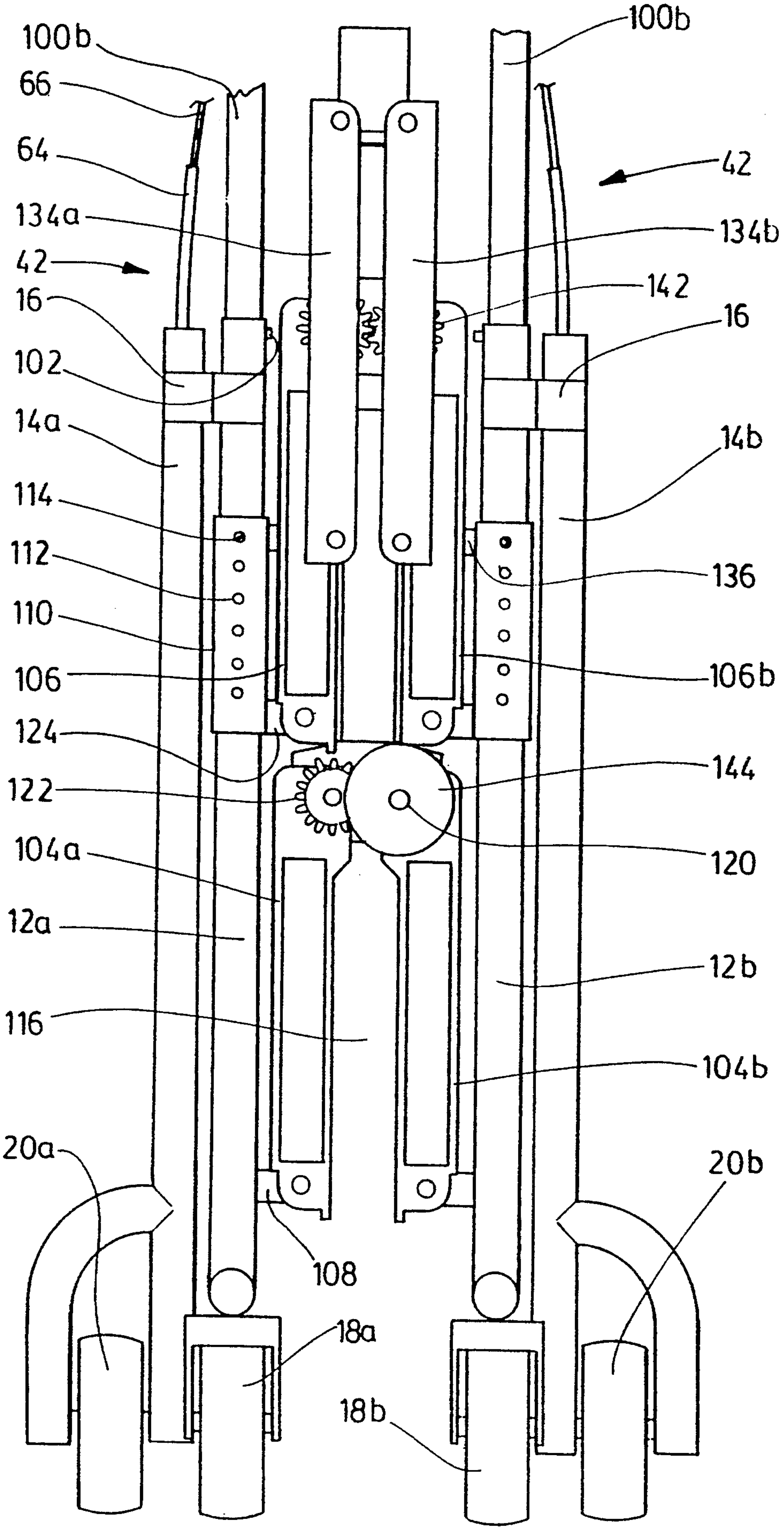

The means whereby they may be folded or collapsed laterally or transversely is best understood with reference to FIGS. 5 and 6.

In this case it will be seen that each of the side members 12a-12b is connected to pairs of swingable arms 104a-104b and 106a-106b. The outer ends of the lower arms 104 are secured to flanges 108, which are secured to the lower ends of side frames 12.

The outer ends of the upper arms 106 are secured to slidable sleeve members 110.

The sleeve members 110 are slidable on their respective side frames 12, and may be secured in various adjustable positions by means such as a spring-loaded detent 112, engaging any one of holes 114 in sleeve 110. Such spring-loaded detents are well known in the art, and particular in relation to adjustment of telescopic members relative to one another and require no special description.

The inward ends of the swinging arms 104 and 106 are connected respectively to a central post 116. Post 116 is provided at its lower end with attachment flanges 118, and the inward ends of lower arms 104 are secured to flanges 118, by pivot pins 120. Pivot pins 120 in turn engage gears 122, which are geared together so that the two arms 104—104 must swing in unison.

The upper arms 106 are secured by flanges 124 to their respective sleeves 112, for pivoting action as shown. The inward ends of upper arms 106 are secured to flanges 126 which are in turn attached to sliding sleeve 128.

Sleeve 128 is slidable on post 116, and may be preset in a desired position, by means of a detent 130 operating in a plurality of holes 132.

In this way, the upper arms 106 may be slid upwardly in relation to the post 116 and also in relation to the side frames 12, and still remain parallel to the lower arms 104.

In order to provide seating for a person, two seat portions 134a-134b are provided. The outer ends of seat portions 134 are secured to flanges 136 mounted on sleeves 110, by suitable pivots.

The inner ends of the seat portions 134 are secured to a cross member 138 which is in turn secured to sleeve 128, again being provided with suitable pivots.

The two seat portions 134a-134b are so dimensioned that they do not meet in the centre even when fully extended (FIG. 1). This is so, as to permit a flexible handle 140 to be extended upwardly, for ease of carrying, when the walker is collapsed, and at the same time, being sufficiently flexible so as to permit comfortable seating.

Gears 142 connect the inward pivot ends of arms 106, so as to cause them to swing inwardly and outwardly in unison.

In order to permit the walker to be used in a semi-extended fashion, for example as may be required in a dwelling or the like, a frictional locking Wheel 144 may be provided, which may be tightened up on one of the pivots 120 for example, of the lower arms 104, thereby locking the arms 104 and 106 in semi-extended position, thereby providing for use in a dwelling, where doorways and like may be somewhat too narrow for the fully extended position of the walker.

The foregoing is a description of a preferred embodiment of the invention which is given here by way of example only. The invention is not to be taken as limited to any of the specific features as described, but comprehends all such variations thereof as come within the scope of the appended claims.

What is claimed is:

1. A walking aid for a handicapped person and which comprises;
a frame;
wheels on said frame for engaging a walking surface;
brake means for engaging at least one of said wheels;
handle means attached to said frame, and being oriented at a suitable height for a person, who is thereby enabled to push the walking aid along the walking surface;
two fixed handbar portions fixed to said handle means oriented for gripping by respective hands of the person each said fixed handbar portion defining a predetermined longitudinal axis;
at least one brake operating moveable member movably secured to a said fixed handbar portion in alignment with its said predetermined axis whereby said moveable member may be swung relative to said one fixed handbar portion, said moveable member being normally aligned with and substantially coaxial with said fixed handbar portion, movement of said moveable member moving the same out of such alignment, and,
brake connection means extending between said fixed handbar portion and said moveable member, whereby movement of said moveable member out of alignment with said fixed handbar portion will cause movement of said brake connection means thereby applying said brake means, and retarding said walking aid.

2. A walking aid as claimed in claim 1 and wherein said fixed handbar portions are attached to said handle means of said frame of said walking aid at spaced apart locations, and opening means in at least one said fixed handbar portion for receiving said brake cable therethrough, whereby said fixed handbar portion may be used as a handgrip by a person for hand gripping and pushing said walking aid, with said brake cable passing within a said hand gripping said fixed handbar portion.

3. A walking aid as claimed in claim 1 and wherein said moveable member comprises an endwise-axial extension of said fixed handbar portion, coaxial with the central axis thereof, and a pivot axis defined between said fixed portion and said moveable member, offset to one side of said central axis thereof, whereby movement of said moveable member relative to said fixed portion will cause extension of said brake cable as aforesaid.

4. A walking aid as claimed in claim 1 and wherein said moveable member incorporates recess means for securing an end of a flexible brake cable.

5. A walking aid as claimed in claim 4 and wherein said brake cable comprises a cable sleeve and an inner moveable cable portion, and wherein said fixed handbar portion incorporates abutment means for engaging said cable sleeve, while permitting said cable portion to move therethrough.

6. A walking aid as claimed in claim 5 and wherein said fixed handbar portion incorporates adjustment means for adjusting the position of said abutment means and said cable sleeve relative to said fixed handbar portion.

7. A walking aid as claimed in claim 1 and including an outer continuous flexible cover member, adapted to enclose and cover both said fixed handbar portion and said moveable member, whereby hinging of said moveable member relative to said fixed handbar portion takes place within said outer cover member.

8. A walking aid as claimed in claim 5 wherein said fixed handbar portion defines an elongated recess, and including a moveable block member located within said recess, and adjustable means engaging said moveable block member for moving the same within said recess axially relative to said fixed handbar portion, said abutment means being located in said moveable block portion.

9. A walking aid as claimed in claim 8 and including an adjustment screw member extending through said fixed handbar portion, and being received in a threaded opening in said moveable block portion, for adjusting the position of the same relative to said fixed handbar portion.

10. A walking aid as claimed in claim 9 and wherein said moveable block portion defines a cable opening therethrough, for receiving said brake cable therethrough, and an enlarged counter bore registering with said cable opening, for receiving said brake sleeve therein, and defining said abutment means.

11. A walking aid for a handicapped person and which comprises;

first and second side frames, and wheels carried on respective side frames for engaging a walking surface;

handle means attached to said side frames and oriented at a suitable height for a handicapped person;

first and second transverse arm members secured to respective first and second side frames, and extending transversely in registration with one another between said first and second side frames;

interlocking rotational means connecting between said first and second arms, whereby said first and second arms are caused to swing in unison with one another, thereby permitting said side frames to be moved between folded, and extended positions, and, adjustable locking means for locking said first and second transverse arms intermediate semi-extended positions.

12. A walking aid as claimed in claim 11 and including a central post member located intermediate said side frames, and pivot means connecting said first and second transverse arms to said central post member.

13. A walking aid as claimed in claim 12 and wherein said first and second transverse arm members comprise first and second lower arm members and first and second upper arm members, and including moveable mounting means mounting said first and second upper arm members to respective said first and second side frames, and moveable mounting means mounting said first and second transverse arm members to said central post member, whereby said first and second upper arm members may be raised and lowered relative to said first and second lower arm members.

14. A walking aid as claimed in claim 13 and including seating portions swingably connected to respective said first and second upper arm members, and moveable in unison therewith.

15. A walking aid as claimed in claim 11 and wherein said first and second side frames include respectively front and rear side frame portions, pivot means connecting said first and second side frame portions together for swinging together and apart from one another, and strut members extending between said front and rear frame portions, for holding the same in their swung apart position.

* * * * *